UNITED STATES PATENT OFFICE.

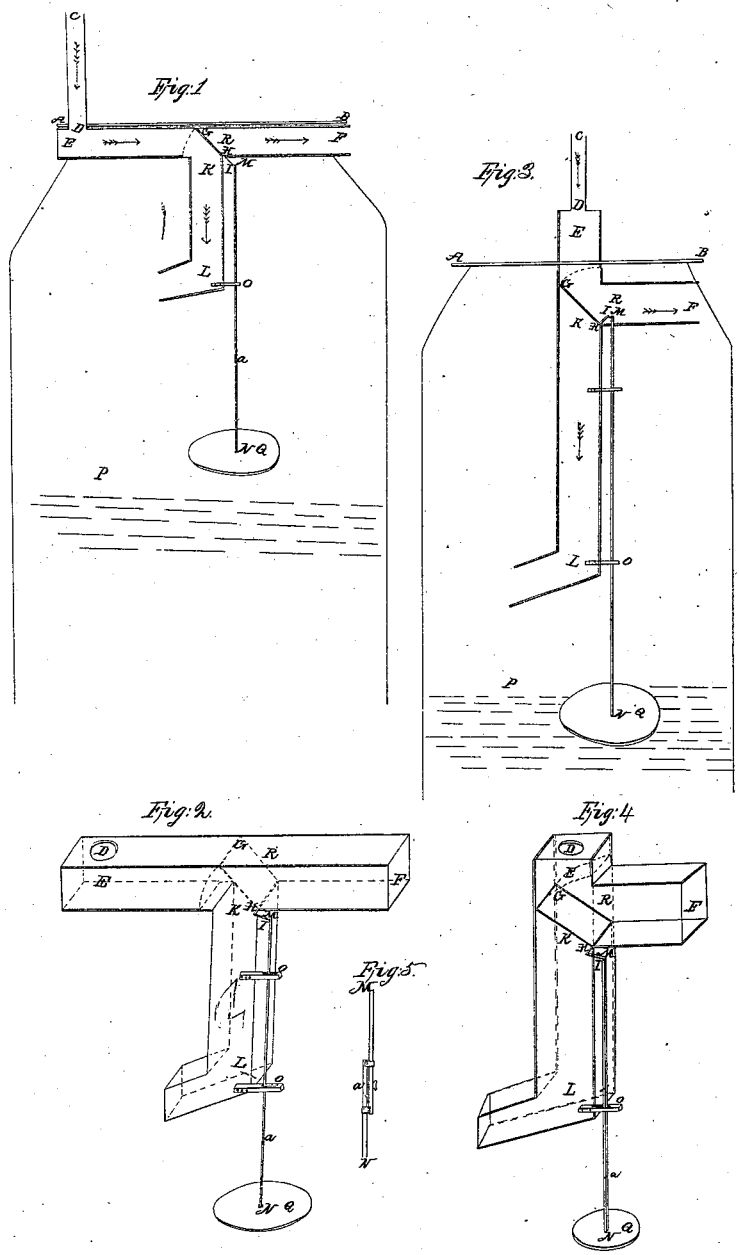

ABEL BEACH, OF IOWA CITY, IOWA.

IMPROVEMENT IN AUTOMATIC CISTERN-REGULATOR.

Specification forming part of Letters Patent No. 41,753, dated March 1, 1864.

*To all whom it may concern:*

Be it known that I, ABEL BEACH, of Iowa City, in the county of Johnson and State of Iowa, have invented a new and useful improvement in turning off by automatic action rain-water from a cistern when filled to a given and required depth, and in other cases to change the course of a current of water by means of a valve operated by a float; and I do hereby declare that the following is a full, clear, and exact description of the construction and operation of the same, reference being had to the annexed drawings, making it a part of this specification, in which—

Figure 1 is a perpendicular section of the apparatus I have constructed when the water is admitted to the reservoir by a horizontal pipe; Fig. 2, a perspective view of the same; Fig. 3, a perpendicular section as it is constructed when the water is admitted by a perpendicular pipe; Fig. 4, a perspective view of this latter, and Fig. 5 a plan for lengthening or shortening the float-rod.

The nature of my invention is, to have a float placed in any reservoir which is made for the reception of water or other liquid, in connection with a valve placed in the conducting-pipe, so that when the float rises to a fixed point the valve shuts off the water and diverts it to another channel.

To enable others to make and use my invention, I will proceed to describe its construction and operation by reference to the diagrams, in which the same letters are employed to represent similar parts in the different figures.

When the water is admitted to the reservoir P by a horizontal pipe or tube, Figs. 1 and 2, let E F represent such tube, which can be made of any desired material, size, and form, but which is here represented as square. It can in connection with a cistern be placed either above or underneath the platform A B. On the under side of this tube is an opening, K, which is the mouth of another and connecting tube K L, leading into the reservoir, and which is opened or closed by a valve, G H, (made of any common material,) operated by a float, 2, which is let down into the reservoir to any depth by a connecting-rod, M N, or other connection. The float is here shown to work the valve by a crank, H I M, outside of the tube. The float may be of wood or metal, and hollow or not, according to the power required to work the valve. The float-rod is here made to pass through an arm, O, attached to the tube, (of which two may be used,) which preserves the proper direction of its action, and also serves as a rest by means of a pin or knob of the rod when the valve is raised. The float may be adjusted to any required position by means of a joint, and slides in the rod at A below the arm, as shown in Fig. 5; or it may be made to move up and down the rod, and fastened in any common way.

The operation is as follows: When the water is admitted to the tube E F at D, it passes directly into the tube K L, leading to the reservoir, whenever the water of the reservoir is below the float, as in Fig. 1, the weight of the float, acting on the crank H I M, serving to open the valve G H; but when the water fills to the float the raising of the float closes the valve and diverts or changes the current to F, when it passes off in the case of a cistern above the surface of the ground, and conducted wherever desired. This improvement thus effectually prevents the overflowing of a cistern, and can be used on perfectly-level ground.

When the water is admitted to the reservoir by a perpendicular pipe or tube, Figs. 3 and 4, the valve G H is affixed to one side of the tube at H, and when the water of the reservoir is below the float is closed against the pipe R F, which when open conducts the water away from the reservoir at R; but when the water rises to the float, as in Fig. 3, the rising of the float throws the valve to the position G, and thus diverts the current in the pipe R F, as before described. Above the valve, and on the side of the tube E L, Fig. 3, may be made a small projection, and on the bottom of the valve may be affixed an apron to prevent leakage into pipe R F when the valve is closed at R.

If the valve is placed in the tube at an angle of forty-five degrees when opened to G, the crank H I in Figs. 1 and 2 should make an angle with the plane of the valve of about one hundred and fifty-seven and a half degrees, and in Figs. 3 and 4 of about one hundred and twelve and a half degrees.

It is evident the foregoing plan may be modified so as to have the valve open downward and the float-rod attached to the under side of it and within the tube K L, or that the valve may be raised by a pulley connected with the float, and made of sufficient weight to fall back, so as to close the pipe leading to the reservoir, even against a head of water when the float shall have reached its required height, and that the valve may be worked by other obvious means.

In the tube K L, leading to a cistern, may be put charcoal and other suitable material resting on a perforated bottom, thus making a convenient filter at little expense.

An obvious advantage of this improvement is the preventing of the admission of the dirt or sediment of water when the reservoir is filled, which sediment with other drains would remain in the cistern, displacing pure water at the drain.

It is not claimed that a float-valve is new and peculiar; nor that it is new to divert a current by an automatic arrangement of this kind, since such devices may be found connected with the steam-gages and feed-waters of steam-engines; but

What I claim as my invention, and desire to secure by Letters Patent, is—

1. The combination and arrangement of a float and valve with a conduit of water and a cistern, all substantially as shown and described.

2. In combination therewith, the arrangement A for adjusting the length of the valve-rod.

ABEL BEACH.

Witnesses:
   Jos. T. Fales,
   Jno. J. Halsted.